United States Patent

[11] 3,620,619

| [72] | Inventor | Sadashige Hayashi<br>Toyohashi, Japan |
|---|---|---|
| [21] | Appl. No. | 49,416 |
| [22] | Filed | June 24, 1970 |
| [45] | Patented | Nov. 16, 1971 |
| [73] | Assignee | Minolta Camera Kabushiki Kaisha<br>Osaka, Japan |
| [32] | Priority | July 8, 1969 |
| [33] | | Japan |
| [31] | | 44/64698 |

[54] EXPOSURE WINDOW SYSTEM FOR ELECTROSTATIC COPIER
4 Claims, 4 Drawing Figs.

[52] U.S. Cl............................................. 355/8,
355/51, 355/66, 355/72
[51] Int. Cl............................................ G03g 15/04
[50] Field of Search........................................ 355/3, 7, 8,
50, 51, 72, 76, 99, 66

[56] References Cited
UNITED STATES PATENTS
3,052,155  9/1962  Hurin et al................... 355/51
3,272,100  9/1966  Teutsch......................... 355/3 UX
3,498,709  3/1970  Kaminstein et al.......... 355/7 X
3,510,218  5/1970  Limberger et al............ 355/51

*Primary Examiner*—Samuel S Matthews
*Assistant Examiner*—Fred L. Braun
*Attorney*—Stanley Wolder ABSTRACT: An exposure window system providing a path for continuously exposing copy paper which has been charged in a charging section to an image of the original through a slit while the copy paper is being guided through the path. Instead of disposing filaments for guiding the copy paper along a plane in the opening for receiving the image of the original, the exposure window comprises a first transparent glass plate supported parallel to a guide plate at a position proximate to an inlet of the original and a second transparent glass plate extending from the rear end of the first glass plate to an outlet. The end of the second glass plate near the inlet is slightly projected outward with respect to the guide plate. The inclination of the second glass plate reduces the area of the copy paper in contact with the glass plate and therefore prevents the copy paper from jamming the exposure path attributable to the electrostatic charge and moisture of the copy paper.

PATENTED NOV 16 1971 3,620,619

Inventor
SADASHIGE HAYASHI
By Stanley Wolder
Attorney

Fig. 3
Fig. 4
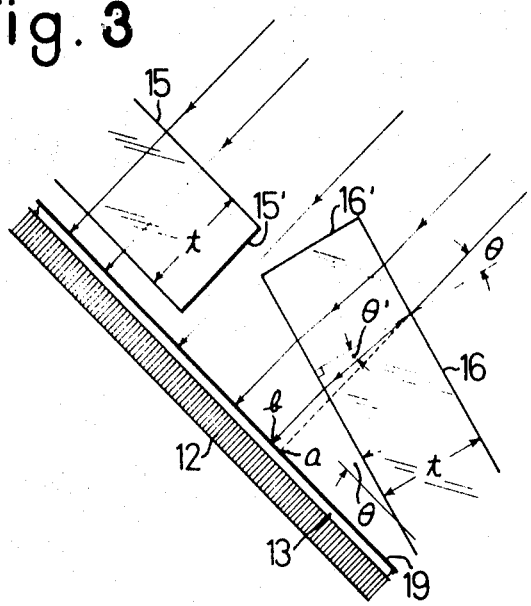
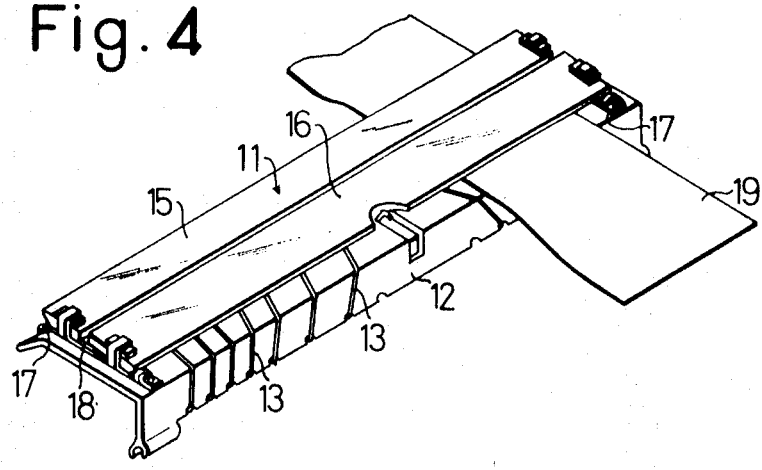
Inventor
SADASHIGE HAYASHI
By Stanley Wolder
Agent

EXPOSURE WINDOW SYSTEM FOR ELECTROSTATIC COPIER

BACKGROUND OF THE INVENTION

The present invention relates to an exposure window system in an electrostatic copier and more particularly to an improved exposure window system which has overcome a defect of jamming the exposure section when charged copy paper travels through the section.

As already known in the art, an exposure system in copiers of such slit exposure type comprises means for guiding copy paper and means provided with an opening for exposing the photoconductive coating of copy paper to an image of the original and divergent strands of nylon filament extending over the opening outwardly from the center line of the path of movement of the paper (U.S. Pat. No. 3,272,100).

Also known is a system in which strands of like filament are provided on the surface of a window of transparent material which surface faces the copy paper, the strands of filament extending outwardly from the center line in the direction of travel of the copy paper. However, such system is defective in that a clear image can not be produced since the coating of the copy paper is marred when brought into contact with the filament during exposure.

SUMMARY OF THE INVENTION

A primary object of the present invention is to provide an improved exposure window system for an electrostatic copier.

Another object of the present invention is to provide an improved exposure window system which causes no defacement to the light sensitive coating of copy paper.

Another object of the present invention is to provide an exposure window system which comprises a window made of a substantially transparent material and disposed on the side of the light sensitive coating of copy paper so that the coating may be exposed to image forming rays from the original without any interference.

Still another object of the present invention is to eliminate jamming of the exposure system which is liable to take place due to sticking of copy paper caused by its moisture content or electrostatic charge when the copy paper travels through an exposure path.

In accordance with the present invention the filament conventionally employed in the path of the copy paper is provided only on a guide plate for guiding the back face of the copy paper and a window for receiving an image of the original comprises a first plate made of a transparent material and disposed adjacent to an inlet for the copy paper and a second plate made of a transparent material and slightly outwardly inclined at its front end in contact with the rear end of the first plate, the second plate forming an outlet of the paper at its rear end. Such inclination of the second transparent plate provides a pocket in a tunnellike path formed by the guide plate and the first and second transparent plates to thereby reduce the area of the copy paper in contact with the transparent plate, facilitate trouble-free passage of the copy paper and prevent the copy paper from jamming the system. Since the coating of the copy paper does not contact with the filament locally and exposure is effected through the window of transparent material which is transparent over the entire area and substantially free of refraction of light and overlapping or disturbance of the image, clear copies can be obtained.

BRIEF DESCRIPTION OF THE DRAWINGS

FIG. 3 is a view illustrating the state of refraction of light in the present system.

FIG. 4 is a perspective view of the exposure window system.

DESCRIPTION OF THE PREFERRED EMBODIMENT

Figure 1:
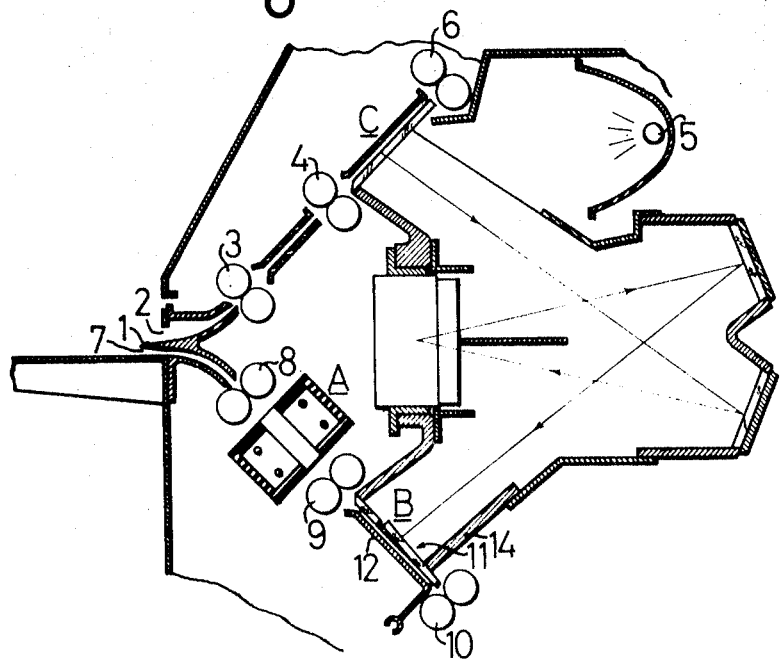
FIG. 1 is a fragmentary side elevation in section showing an electrostatic copier of the type in which an exposure window system of the present invention is used.

Referring to FIG. 1 showing a slit exposure system in an electrostatic copier, designated at A is a charging section for charging the photoconductive coating of copy paper and at B an exposure section for subjecting the charged photoconductive coating to exposure to produce a latent image.

The original to be copied is fed to the copier through a slitlike inlet 2 partitioned by a tonguelike member 1 and sent by pairs of rollers 3 and 4 to a projecting section C, where it is subjected to the light from a lamp 5. Further carried toward an unillustrated outlet by rollers 6, the original is sent out from the copier.

By means of the tonguelike member 1, the copy paper is separated from the original, fed into the copier through a slitlike inlet 7 formed under the tonguelike member 1, passed through the charging section A and then sent into the exposure section B by pairs of rollers 8 and 9. At the charging section A, the paper is charged on the photoconductive coating by being subjected to a suitable voltage and at the exposure section B it is exposed to n, image of the original projected from the projecting section C to produce a latent electrostatic image. The copy paper thus subjected to a desired amount of exposure while passing through the exposure section B is carried into a developing section (not shown), where a visual image is produced to make a copy.

Figure 2:
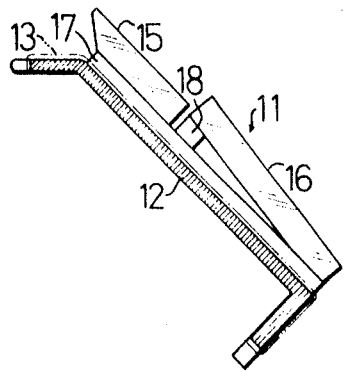
FIG. 2 is a side elevation in section showing a system of the present invention.

The present exposure window system generally designated at 11 is disposed in the exposure section B. The exposure section B comprises the exposure window system 11, a guide plate 12 and a frame 14 for limiting the opening of the exposure window. As shown in FIGS. 2 and 3, a filament 13 for guiding the back face of the copy paper is provided on the guide plate 12 in conventional manner. A tunnellike path for the copy paper is formed between the exposure window system 11 and the guide plate 12.

The exposure window comprises two substantially transparent plates such as glass plate which are separated along a line at a right angle with the direction of movement of the copy paper. The first glass plate 15 adjacent to an inlet of the copy paper is positioned parallel to the guide plate 12, while the second glass plate 16 in contact with the rear end of the first glass plate 15 is inclined, with respect the plane of the paper path, to such an extent that even when the image forming rays from the original are refracted the resultant influence on the copy paper is within an allowable range when a visual image produced on the paper is seen with the unaided eyes. The second glass plate 16 is further so disposed that the height of the clearance of an outlet for the copy paper is the same as that of the inlet. The opposite sides of the glass plates 15 and 16 are fixedly supported on the guide plate 12 by adhesive holding members 17 and 18. Accordingly, a pocket to provide an enlarged path is formed in the interior of the tunnel for passing the copy paper, with the result that the area of contact between the copy paper and the glass plate is substantially reduced to a very small portion of the exposure window area. Designated at 19 in FIGS. 3 and 4 is the copy paper travelling through the exposure section B.

FIG. 3 is a view showing the state of refraction of the image forming rays in the exposure window system in which the second glass plate 16 is inclined relative to the first glass plate 15. For simplification, it is assumed that the image forming rays are parallel and the first glass plate 15 and the second glass plate 16 have the same thickness $t$ and the same index of refraction $n$, the second glass plate 16 being inclined at an angle of $\theta$ with respect to the surface of the copy paper (i.e., image-forming plane). It will then be apparent from the figure that, as compared with the image forming rays passing through the first glass plate 15, the image forming rays passing through the second glass plate 16 are deviated to a point b which is away by $\overline{ba}$ from a point a where the image would otherwise be formed by straight rays, the $\overline{ba}$ being represented by the following equation:

$\overline{ba} = (t/n) \tan\theta (n\cos\theta' - \cos\theta)$.

For this reason, the clearness of the image will correspondingly be lowered theoretically, but insofar as the deviation is within 16" in terms of visual angle when seen with the unaided eyes, it may generally be negligible. Accordingly, substantially trouble-free practical use is insured within the above range without clearness of the copy being deteriorated. Further by frosting the end faces 15' and 16' of the glass plates 15 and 16, the copy paper during travel for exposure can be shielded from light uniformly over the entire surface thereof, so that the light incident on the end faces and the refracted light will be kept out without producing any influence on the clearness.

Due to the fact that the photoconductive surface of the copy paper is no longer brought into contact with filaments during its travel through the exposure section B unlike in conventional systems, a clear image can be produced in accordance with the present invention, while the sticking of the copy paper to the inner face of the exposure section caused by the moisture content of the paper or electrostatic charge thereon can be prevented, hence the object to preclude jamming of the system has been achieved.

I claim:

1. In an exposure window system in an electrostatic copier to be disposed in an exposure section providing a path for continuously exposing copy paper charged in a charging section to an image of the original through a slit while the copy paper is being guided along said path, an exposure window comprising first and second transparent glass plates separated along a line at a right angle with the direction of movement of the copy paper, said first glass plate adjacent to an inlet for the copy paper being supported parallel to a guide plate, said second glass plate extending from the rear end of said first glass plate to an outlet and being so inclined that the end thereof near said inlet is projected slightly outward with respect to said guide plate with the height of clearance of said outlet being equal to the height of said inlet.

2. The system as claimed in claim 1 wherein said second glass plate is fixedly inclined to such an extent that the overlapping and disturbance of the image due to refraction of rays are within an allowable range when seen with the unaided eyes.

3. The system as claimed in claim 1 wherein said path for the copy paper disposed in said exposure section is provided with a pocket which forms a substantially enlarged path on the side of said exposure window so as to reduce the area of contact between said glass plate and the copy paper.

4. The system as claimed in claim 1 wherein a filament is provided on said guide plate.

* * * * *